United States Patent [19]

Sakamoto et al.

[11] Patent Number: 5,105,132
[45] Date of Patent: Apr. 14, 1992

[54] METHOD AND DEVICE FOR CONTROLLING HEADREST

[75] Inventors: Takao Sakamoto; Hiromitsu Ogasawara, both of Akishima, Japan

[73] Assignee: Tachi-S Co., Ltd., Tokyo, Japan

[21] Appl. No.: 603,876

[22] Filed: Oct. 23, 1990

[51] Int. Cl.$^5$ .............................................. B60N 2/48
[52] U.S. Cl. .................................... 318/434; 318/266; 318/286; 318/469
[58] Field of Search ............... 318/255, 256, 264, 265, 318/266, 280, 282, 283, 286, 430, 434, 466, 467, 468, 469

[56] References Cited

U.S. PATENT DOCUMENTS

4,797,824  1/1989  Sugiyama et al. .............. 318/467 X
4,809,180  2/1989  Saitoh ................................. 318/466
4,935,680  6/1990  Sugiyama ........................... 318/567

Primary Examiner—Bentsu Ro
Attorney, Agent, or Firm—Oldham & Oldham Co., Ltd.

[57] ABSTRACT

A method and device for controlling a headrest provided on a seat back of a seat, in which there is arranged an over-load detecting system for detecting an over-load state of a motor and automatically stopping the motor if the over-load state is detected during displacement of the headrest to a use position, or automatically driving the motor to return the headrest to a use position if the over-load state is detected during displacement of the headrest to a non-use position. This allows for removing an object caught in between the headrest and seat back with much safe.

10 Claims, 6 Drawing Sheets

METHOD AND DEVICE FOR CONTROLLING HEADREST

BACKGROUND OF THE INVENTION

1. Field of the Invention

The present invention relates to a control of a headrest used in automotive seat, and particularly to method and device for controlling the displacement of the headrest between its use position for supporting the head of an occupant and non-use position where the headrest is at a location down below the view field another occupant.

2. Description of Prior Art

A headrest control is generally effected by an automatic switch to displace a headrest body between a use position where it supports the head of an occupant on the seat and a non-use position where it is lowered away from the view field of another occupant. In particular, the headrest on an assistant seat next to a driver seat, as such automatic control is applied, will be moved away from both view fields of the driver and rear-seat occupant.

In this kind of headrest control, an over-current detecting system is adopted for detecting presence of an object which hinders the displacement of the headrest, by means of detecting an over-current produced from the over-load sate of a motor. The system stops the drive of the motor in response to the over-current, thereby ceasing the displacement of the headrest and protecting the motor against damage and overheat.

However, coventionally, in such over-current case, the headrest is stopped as it is and just holds the object between itself and the seat back, which result in requiring the occupant to operate the automatic switch in order to move the headrest from the object, and remove it from between the headrest and adjacent part of the seat. Thus, the operation in such case is annoying, which is particularly the case for the rear-seat occupant who can not easily see and remove the object from the assistant seat.

Moreover, the conventional automatic switch is a one-touch type one which has a memory function to store a switch area being depressed "on", to permit automatical displacement of the headrest between the use and non-use positions by depressing on the relevant switch area at one time. This arises a disadvantageous aspect that an unintentional depress upon the switch will cause the headrest to move against the object if any and hold it, thus resulting in such over-load state of the motor, or give a damage to an occupant on the seat on which is provided the headrest.

SUMMARY OF THE INVENTION

In view of the above-stated drawbacks, it is therefore a purpose of the present invention to provide a method and device for controlling a headrest, which permits safety-oriented control of the headrest and prevents erroneous switch operation therefor.

To achieve such purpose, in accordance with the present invention, it is so arranged that, in the case of the headrest being displaced to a non-use position, if an over-load state is detected for an associated motor, the motor is at once driven reversely so as to return the headrest to a use position, whereby a object or article caught in between the headrest and seat back of a seat, if any, can be removed, and that the motor is not driven until a given time lapses after having operated an automatic switch, whereby an intentional or erroneous operation of the automatic switch, which takes so quickly within such delay time, will not cause the headrest to move towards the non-use position.

In one aspect of the present invention, the presence or absence of an occupant on the seat having such headrest is detected, as a further safety function, with such an arrangement that only the absence of occupant on the seat will allow displacement of the headrest to the non-use position.

In another aspect of the present invention, the opened or closed state of a door of an automobile is detected, with such an arrangement that, in the case where the door is opened, with the headrest being located at the non-use position, the headrest is automatically returned to the use position. Thus, the occupant can climb onto the seat without hindrance of the headrest.

DETAILED DESCRIPTION OF PREFERRED EMBODIMENT OF THE INVENTION

FIGS. 1 through 4 shows an embodiment of a headrest control device (10) which basically comprises a motor (12), automatic switch (14), central processing unit (to be referred to as CPU), discrimination circuit (18), over-current detecting resistance (42), fist and second relays (36)(37), and timer (40). Preferably, the motor is a DC geared motor.

Figure 1:
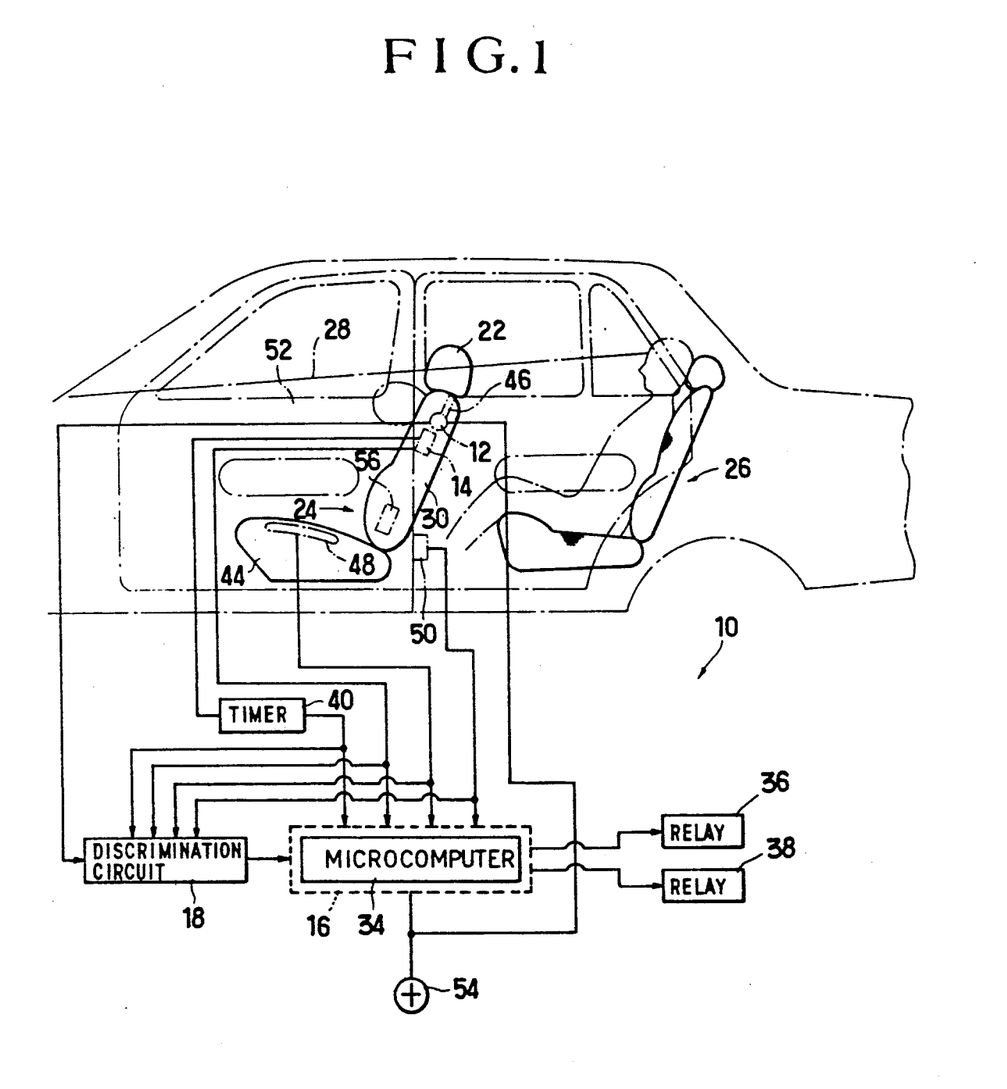
FIG. 1 is a schematic block diagram of a headrest control device in accordance with the present invention.

As shown in FIG. 1, a headrest (22) is provided upon an assistant seat (24) next to a driver seat (not shown), and displaceable between a use position where the headrest (22) supports the head of an occupant on the seat, as indicated by the solid line and a non-use position where the headrest (22) is inclined forwardly of the seat back (30) to thereby be moved downwardly below the view field of an occupant on the rear seat (26), as indicated by the phantom line. The non-use position permits the rear-seat occupant to attain a good view at the front side of the automobile.

Figure 3:
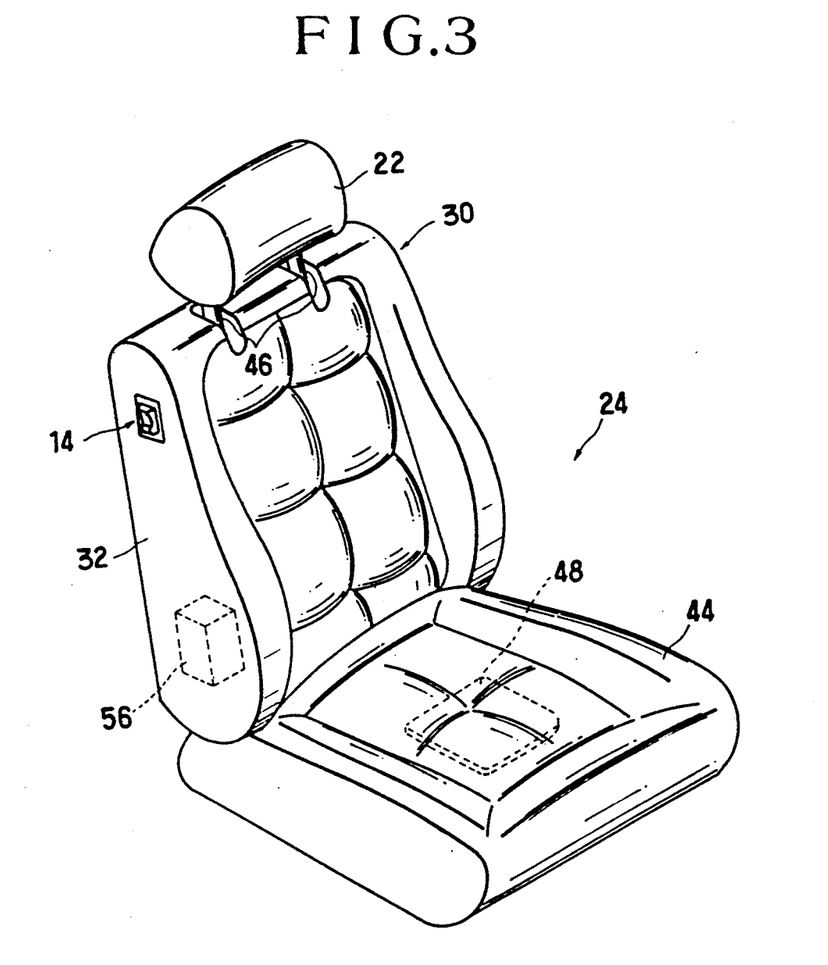
FIG. 3 is a schematic perspective view of an assistant seat.

The automatic switch (14) is a seesaw-type, self-returnable switch having a first contact point (14a) and second contact point (14b), and provided at the lateral wall (32) of the seat back (30) of the assistant seat (24), namely, at the side next to a driver, thus making accessible thereto by both driver and assistant-seat occupant, as shown in FIG. 3. The switch (14) is connected with the CPU (16), nd adapted for controlling the drive of the motor (12). Preferably, the switch (14) is operable in a one-touch way, having a memory functio capable of storing in memory the switch area being depressed in correspondence with one of the two relays (36)(38).

Figure 4:
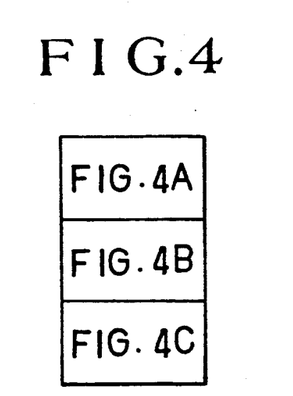
FIG. 4 is a flow chart comprising three sections FIG. 4(A), 4(B) and 4(C), which shows a specific steps for effecting the control of the headrest, in accordance with the present invention.

The CPU (16) includes a microcomputer (34) which is programmed on the basis of a flow chart as shown in FIG. 4, as will be specified later, and emits proper control signals to actuate either of the first and second relays (36)(38), each including the respective relay contacts (36a)(38a), to thereby cause the motor (12) to drive in one of normal and reverse rotation direction.

Upon operating the automatic switch (14), the headrest (22) is caused by the motor (12) to be displaced between the use and non-use positions, and it is noted here that two limit switches (not shown) are provided such that one of them is for limiting the drive of the motor (12) until the headrest (22) reaches the use position and the other of them is for limiting that until the headrest (22) reaches the non-use position.

Regarding such motor drive, a consideration should be paid to protect the assistant-seat occupant against the non-stop movement of the headrest (22) towards the non-use position. According to the present invention, in order to achieve such protection, the timer (40) is interposed between the first contact point (14a) of the automatic switch (14) and CPU (16) on an electric line. The timer (40) is able to set a desired time and so arranged that after lapse of the set time, the timer will close the line to allow flow of a signal from the automatic switch (14) to the CPU (16), the signal being an instruction to cause the headrest (22) to move towards the non-use position. The set time is preferably about 0.5 seconds. This time delay arrangement avoids a very short time of quick unintentional or erroneous operation of the switch (14) which is done at a time smaller than such 0.5 sec.

Figure 2:
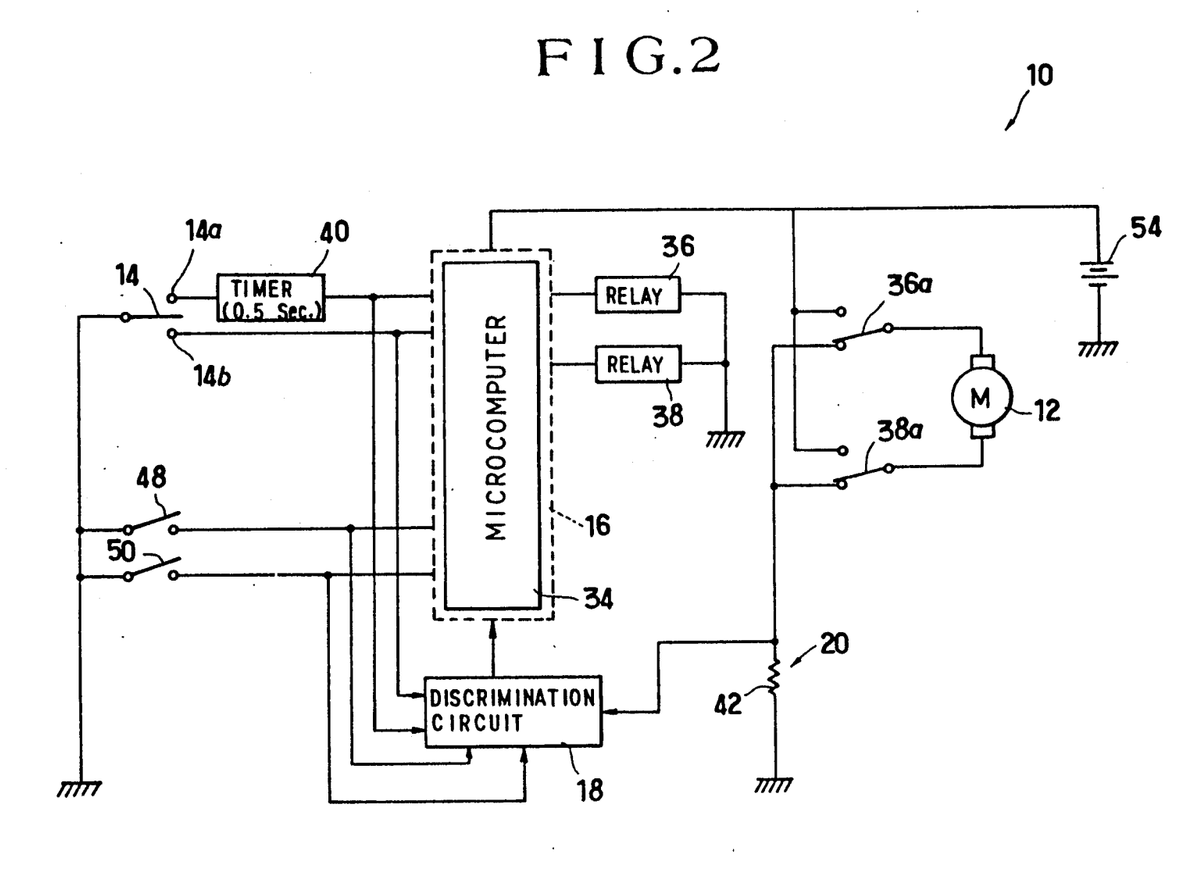
FIG. 2 is a block circuit diagram of the headrest control device in which a central processing unit is a central control source.

The automatic switch (14), as seen from FIGS. 1 and 2, is further connected with the discrimination circuit (18) which is connected with the CPU. The discrimination circuit (18) discriminates the switching state of the automatic switch (14) between the two contact points (14a)(14b) and send a correct switch signal to the CPU (16).

The over-current detecting resistance (42) is connected direct to the motor (12), with the other terminal of the resistance being connected with the discrimination circuit (18), whereby a voltage at that terminal of resistance (42) is checked on by the discrimination circuit (18) which compares such voltage with a given voltage value preset therein. In this connection, let it be assumed that the motor (12) gets into an over-load state due to an object being caught in between the headrest (22) and seat back (30), preventing the headrest (22) from being moved to the use or non-use position, then the torque of the motor (12) becomes so high that a value of current (If) thereto is increased by the reason of an electrical torque-current characteristics of the motor (12), with the result that such increased current value (If) raises a voltage at the related terminal of the over-current detecting resistance (42). Then, as such voltage becomes greater than a given voltage level preset in the discrimination circuit (18), which means that the current value (If) becomes greater than a over-current value (Imax), whereupon a over-current (Imax) is created at the motor (12), the discrimination circuit (28) sends a given signal (warning signal) to the CPU (16), and the CPU (16) supply a proper control signal to the relays (36, 36a, 38, 38a), thereby causing the motor (12) to cease its drive. In that way, the headrest (22) is stopped to avoid an overheat or damage of the motor (12).

In this context, the CPU (16) includes a program for effecting an automatical return of the headrest (22), according to which, if the headrest (22), when being moved to the, non-use position, encounters such hindrance of an object between itself and seat back (30) and is stopped by virtue of the foregoing over-current detecting system, then simultaneously the motor is driven to return the headrest (22) to the use position away from the object. Therefore, the object can be taken out from the seat (24) and there is eliminated the undesired holding of the object by the headrest (22).

Additionally, the control device (10) in the present invention includes a seating detector (48) and door detector (50) as a safety function.

The seating detector (48) is preferably a pressure sensitive switch or other suitable sensor for detecting the presence of an occupant on the seat (24). As shown in FIG. 3, the detector (48) is provided in the seat cushion (44) of the seat (24) and is connected with the discrimination circuit (18) and CPU (16), as in FIGS. 1 and 2. Hence, if the presence of the occupant on the seat (24) is detected by the seating detector (43), a signal is supplied therefrom to the discrimination circuit (18) which in turn sends a signal to the CPU (16), and the CPU (16) blocks a signal from the automatic switch (14). Consequently, where the assistant seat (24) is taken by an occupant, the automatic switch (14) is prohibited against operation, and even if the switch (14) is operated, the headrest (22) will not be moved to the non-use position, so that the occupant on the seat (24) is protected against the headrest (22).

The door detector (50) is adopted for detecting the opened or closed state of the front door (52), and connected with the discriminated circuit (18) and CPU (16). In the case where the headrest (22) is located at the non-use position, the detection by the door detector (50) of opened state of the front door (52) will cause drive of the motor (12) to displace the headrest (22) up to the use position. Thus, such automatic motion allows an occupant to readily sit on the seat (24) without hindrance of the headrest (22).

The motor (12) and CPU (16) are connected with a battery (16), and preferably disposed at a control box (56) in the seat back (30) (see FIG. 3)

Figure 4A:
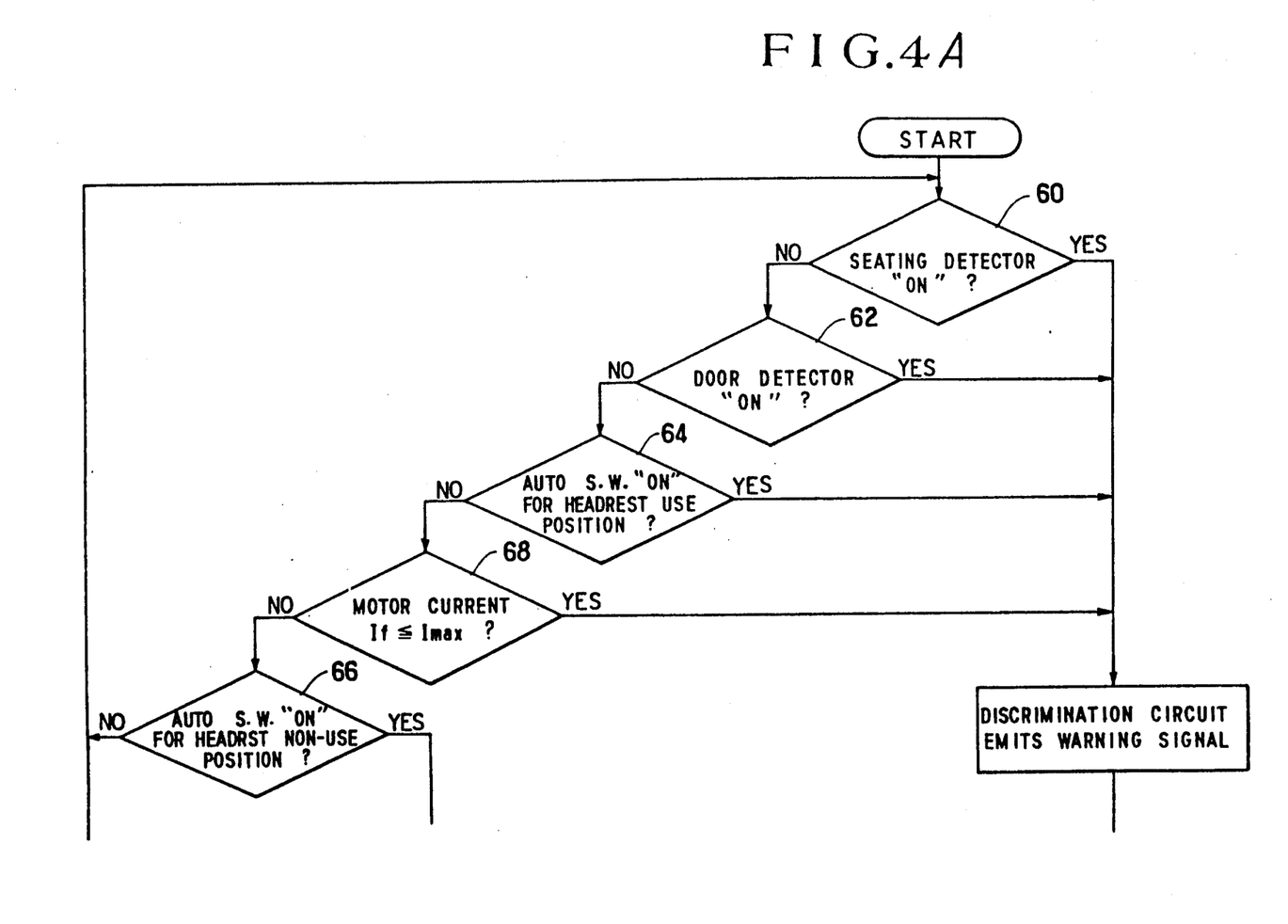
Figure 4B:
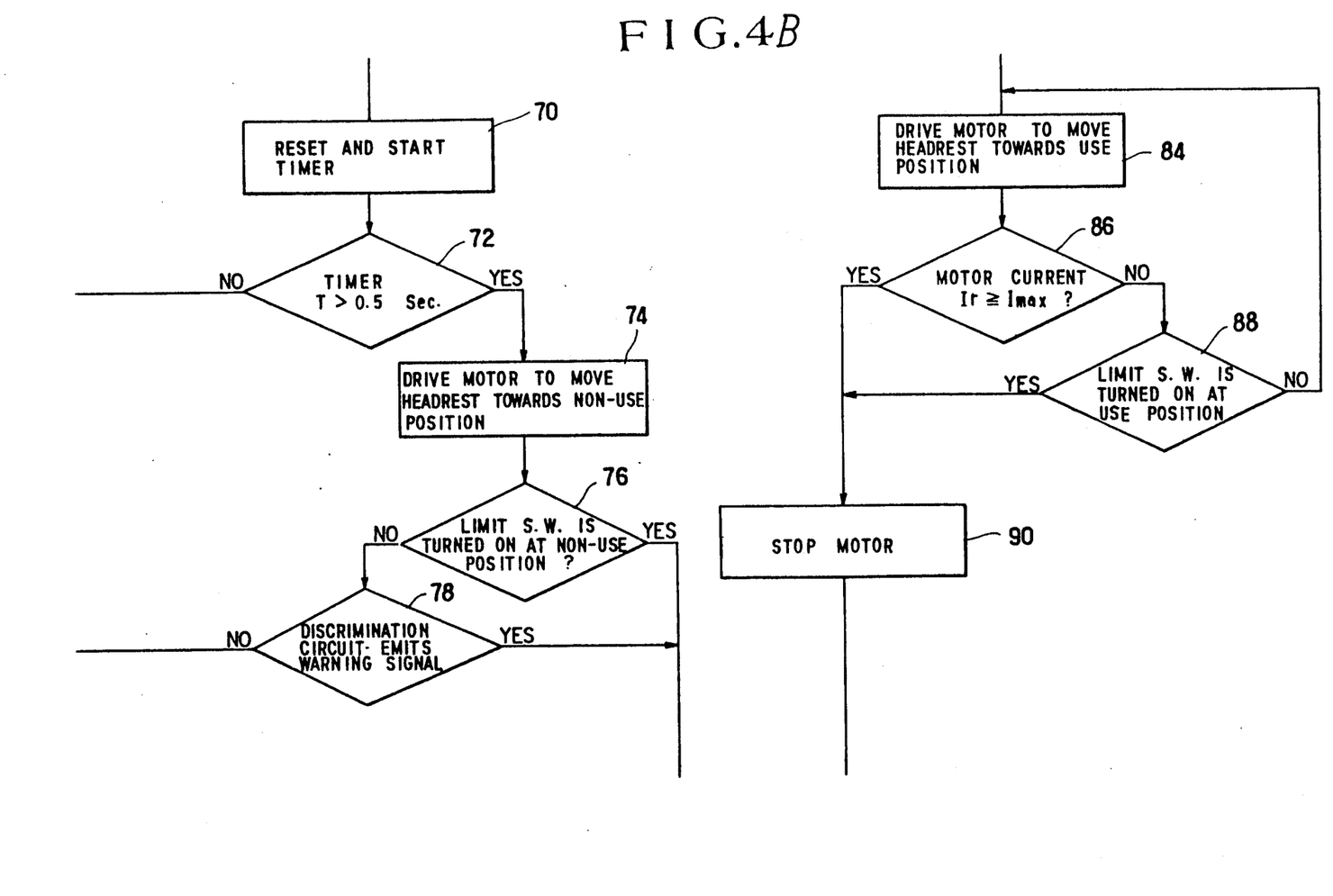
Figure 4C:
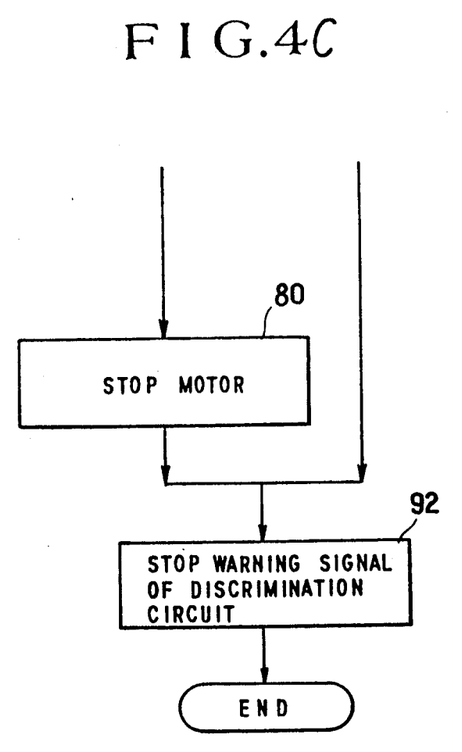

Reference is now made to FIGS. 4A, 4B and 4C, and description will be given in regard to the method for controlling the headrest (22) on the basis of the above-described headrest control device (10), by referring to the flow chart in those figures.

FIG. 4A illustrates a flow of procedures for the abovementioned safety systems associated with the seating detector (48), door detector (50), automatic switch (14), and over-current detecting resistance (42), in order to cause the headrest (22) to be displaced to the use position, away from the way in which an occupant sits on the seat (24). In particular, the block (68) relates, to the above-stated over-current case where an object is caught in between the headrest (22) and seat back (30), in which case, the headrest (22) will be moved to the use position for allowing the object to be removed.

In each of the determination blocks (60), (62), (64) and (68), the negative decision "NO" indicates the steps to go over to the next phase at the block (66) in FIG. 4B, implying that there is no need to return the headrest to the use position. By contrast, the affirmative decision "YES" indicates the steps to undergo the next phase for causing the headrest (22) to move to the use position, at blocks (82), (84), (86) and (88) in FIG. 4B. The "YES" in the blocks (60)(62) indicates that the headrest (22) being located at the non-use position is to be moved up to the use position, when an occupant opens the door and sits on the seat. The "YES" in the block (64) indicates the case where the automatic switch (14) is depressed at the switch area for the second contact point (14b) for moving the headrest (22) to the use position, which needless to say directs the step to the next headrest-move-to-use-position phase (82, 84...) in FIG. 4B. The "YES" in the block (68) indicates the foregoing over-current case, noticing the presence of a object between the headrest and seat back, thus directing the step flow to the same next steps (82, 84...).

Referring now to FIG. 4B, at the block (82), responsive to the "YES" decision at those blocks (60, 62...), the discrimination circuit (18) sends a signal to the CPU (16) to execute the following series of steps from the block (84) to the one (88), in which the headrest (22) is assuredly moved to reach the use position. The block (86) serves as the same function as that (68) to avoid the over-current case during the movement of the headrest (22) to the use position. The block (88) determines whether or not a limit switch (not shown but set forth previously) is turned on at the use position by the fact that the headrest (22) reaches the use position, which implies that the movement of the headrest (22) is kept to be effected until the headrest (22) reaches the use position.

In the FIG. 4B, the block (66) relates to the aforementioned protection systems for preventing any unintentional or erroneous depress of the automatic switch to the contact point (14a) for causing the headrest (22) to be moved to the non-use position. Thus, the series of blocks (66), (70), (72) and (74) provides a time delay steps based on the timer (40). If the automatic switch (14) is by mistake turned on to the contact point (14a), as indicated by "YES" at the flock (66), the timer (40) counts approx. 0.5 sec. at the block (70), and the decision block (72) serves to determine whether the switch (14) is turned on unintentionally or intentionally, by comparing the switch deressing time in reference to the 0.5 sec. time. The "NO" at that block shows the switch (14) to be depressed so quickly as to take time less than the 0.5 sec. reference time, thereby deciding that the switch (14) is turned on by mistake or unintentionally, and ending the step flow. But, the "YES" there indicates the intentional depress on the switch (14), taking time more than the 0.5 sec., thus directing the step flow to the instruction block (74) for causing the headrest (22) to be moved to the non-use position.

Referring to FIG. 4C, the first procedures at the blocks (82, 84...) are led to the block (90) wherein the motor (12) is stopped, directing the step to the block (92) for blocking the signal of the discrimination circuit (18), whereupon the headrest (22) is located at the use position. It should be noted that the block (86) is the second step for detecting the over-load of the motor (12); namely, determining whether a object is caught between the seat back (30) and headrest (22) being on the way to the use position, or not. The "YES" here leads the step to the block (90), where the motor (12) is stopped its drive and thus the headrest (22) is brought to a halt on the way to the use position. The "NO" at that block (86) causes the motor (12) to keep on driving until the headrest (22) reaches the use position, as understandable from the step lines drawn among the blocks (84),(86), (88) and (90). On the other hand, the second procedures at the blocks (66, 70...) are led to the final steps (76)(78)(80) for ensuring the movement and stop of the headrest (22) at the non-use position, after which, the step is ended with the block (92), where the signal of the discrimination circuit (18) is blocked.

It should be understood that the present invention is not limited to the illustrated embodiment but any other modifications, additions and replacements may structurally be possible without departing from the appended claims. For example, the headrest (22) may be the one mounted on the rear seat (26) and the same seating detector and door detector as that (48) (50) may be provided in the rear seat (26) and rear door, respectively. Further, the present headrest control system (10) may be applied also to the vertical movement of the headrest (22) in addition to the fore-and-aft movement thereof as having been described.

What is claimed is:

1. A method for controlling a headrest, in which said headrest is displaceable between a use position where it supports a head of an occupant on a seat and a non-use position where it is moved away from a view field of another occupant on another seat, said method comprising the steps of: detecting an over-load state of a motor which is used for causing the displacement of said headrest;

discriminating a correct electric signal among other signals in order to drive sad motor in a proper manner;

effecting an automatic displacement of said headrest to said use position, if said over-load state of said motor is detected during displacement of said headrest to said non-use position, by way of driving said motor in a direction to cause said headrest to move toward said use position; and causing said motor to cease its drive, if an over-load state of said motor is detected during displacement of said headrest to said use position, whereby said headrest is immediately stopped at a point where said motor over-load state is detected.

2. The method as defined in claim 1, wherein said method includes a step of effecting said drive of said motor toward either of said use and non-use positions by means of an automatic switch, and a step of only permitting said motor to start to drive when said automatic switch is kept turned on for moving said headrest to said non-use position, for over a given time.

3. The method as defined claim 1, wherein said method further includes the steps of:

detecting presence or absence of said occupant on said seat;

allowing said headrest to be displaced to said non-use position, only if the absence of said occupant is detected; and causing said headrest to be automatically returned immediately to said use position, if the presence of said occupant is detected, while blocking an instruction for attempting to move said headrest to said non-use position.

4. The method as defined in claim 1, wherein said method further includes the steps of:

detecting opened or closed state of a door of an automobile in which is provided said headrest;

allowing said headrest to be displaced to said non-use position, only if the closed state of said door is detected; and causing said headrest to be automatically returned to said use position simultaneously with opening of said door, if the opened state of said door is detected and said headrest is located at said non-use position.

5. The method as defined in claim 2, wherein said method further includes the steps of:

detecting presence or absence of said occupant on said seat;

allowing said headrest to be displaced to said non-use position by operation of said automatic switch, only if the absence of said occupant is detected; and causing said headrest to be automatically returned immediately to said use position, if the presence of said occupant is detected, while blocking an instruction for attempting to move said headrest to said non-use position.

6. The method as defined in claim 2, wherein said method further comprises the steps of:

detecting presence or absence of said occupant on said seat detecting opened or closed state of a door of an automobile in which is provided said headrest; and causing said headrest to be displaced to said non-use position, only if both the absence of said occupant and the closed state of said door are detected, and said automatic switch is turned off for causing said headrest to move to said use position.

7. A device for a controlling a headrest, comprising:

a headrest disposed upon a seat back of a seat, said headrest being displaceable between a use position where it supports a head of an occupant on the seat and a non-use position where it is moved away from a view field of another occupant;

a motor for causing said headrest to move between said use and non-use positions;

an automatic switch for controlling a drive of said motor so as to effect said headrest displacement between said use and non-use position;

a central processing unit which processes data being input thereinto, in accordance with a given program;

an over-load detecting means for detecting an over-load state of said motor; and a discrimination circuit for discriminating a correct electric signal among signals from other associated electric elements in said device in order to drive said motor in a proper manner, whereby, when said over-load detecting means detects said over-load state of said motor during displacement of said headrest towards said non-use position, said motor is caused immediately to be driven in a reverse direction so as to return said headrest to said use position automatically, and when said over-load state of said motor is detected by said detecting means during displacement of said headrest to said use position, then said motor is stopped immediately to ring said headrest to a halt at a point where said motor has thus been stopped by said over-load state.

8. The device as defined in claim 7, wherein said over-load detecting means includes an over-current detecting resistance.

9. The device as defined in claim 7, wherein said device further includes at least one of a seating detecting means and a door detecting means, said seating detecting means being adapted for detecting presence or absence of an occupant on said seat and said door detecting means being adapted for detecting opened or closed state of a door of an automobile in which is provided said device.

10. The device as defined in claim 8, wherein said device further includes at least one of a seating detecting means and a door detecting means, said seating detecting means being adapted for detecting presence or absence of an occupant on said seat and said door detecting means being adapted for detecting opened or closed state of a door of an automobile in which is provided said device.

* * * * *